United States Patent
Saedifaez

(10) Patent No.: US 11,288,725 B2
(45) Date of Patent: *Mar. 29, 2022

(54) MANAGING SERVICE PROVIDER SERVICE OPTIONS

(71) Applicant: T-Mobile USA, Inc., Bellevue, WA (US)

(72) Inventor: Sheida Saedifaez, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/883,825

(22) Filed: May 26, 2020

(65) Prior Publication Data

US 2020/0286144 A1 Sep. 10, 2020

Related U.S. Application Data

(60) Continuation of application No. 16/272,892, filed on Feb. 11, 2019, now Pat. No. 10,740,812, which is a division of application No. 12/910,715, filed on Oct. 22, 2010, now Pat. No. 10,204,365.

(Continued)

(51) Int. Cl.
  *G06Q 30/06* (2012.01)
  *G06Q 10/06* (2012.01)
(52) U.S. Cl.
  CPC ......... *G06Q 30/0621* (2013.01); *G06Q 10/06* (2013.01)
(58) Field of Classification Search
  CPC .................. G06Q 30/0621; G06Q 10/06

(Continued)

(56) References Cited

U.S. PATENT DOCUMENTS

| 7,209,949 B2 | 4/2007 | Mousseau et al. |
| 7,236,780 B2 | 6/2007 | Benco et al. |

(Continued)

FOREIGN PATENT DOCUMENTS

| EP | 2591454 | 5/2013 |
| WO | WO 2007/143678 A2 | 12/2007 |
| WO | WO 2010/006366 A2 | 1/2012 |

OTHER PUBLICATIONS

International Search Report and Written Opinion in PCT/US2011/043093 dated Feb. 29, 2011.

(Continued)

*Primary Examiner* — Russell S Glass
(74) *Attorney, Agent, or Firm* — Knobbe, Martens, Olson & Bear, LLP

(57) ABSTRACT

A system and method for the management of services offered to subscribers by service providers are provided. A service management component manages service plan options that are provided by one or more service providers and that are made available to subscribers. The service management component processes requests from one or more service provider components to dynamically update service plan information. Such requests may include requests to add or delete service plans, add or delete features to a service plan, add or delete rule sets associated with a service plan, and the like. In this embodiment, the service management component maintains various data stores associated with available service plans and with current subscriber information that facilitate a mapping of updated service plan options to subscribers. Accordingly, the service management component manages a framework that allows the management of the mapping information.

20 Claims, 9 Drawing Sheets

Related U.S. Application Data

(60) Provisional application No. 61/362,242, filed on Jul. 7, 2010.

(58) Field of Classification Search
USPC .......................................................... 705/26.5
See application file for complete search history.

(56) References Cited

U.S. PATENT DOCUMENTS

| | | |
|---|---|---|
| 8,255,281 B2 | 8/2012 | Benson et al. |
| 8,280,943 B1 | 10/2012 | Saedifaez |
| 8,858,204 B2 | 10/2014 | Saedifaez |
| 10,204,365 B2 | 2/2019 | Saedifaez |
| 10,740,812 B2 * | 8/2020 | Saedifaez .......... G06Q 30/0621 |
| 2003/0212598 A1 | 11/2003 | Raman et al. |
| 2004/0111429 A1 | 6/2004 | Bou-Ghannam et al. |
| 2005/0020243 A1 | 1/2005 | Benco et al. |
| 2008/0045234 A1 | 2/2008 | Reed |
| 2008/0071629 A1 | 3/2008 | Benson et al. |
| 2010/0002668 A1 | 1/2010 | Tan et al. |
| 2010/0011020 A1 | 1/2010 | Saedifaez |
| 2010/0203865 A1 | 8/2010 | Horn et al. |
| 2010/0241544 A1 | 9/2010 | Benson et al. |
| 2010/0261450 A1 | 10/2010 | Martin-Cocher |
| 2011/0103265 A1 | 5/2011 | Dilipkumar Saklikar |
| 2012/0303476 A1 | 11/2012 | Krzyzanowski |

OTHER PUBLICATIONS

Communication pursuant to Rule 115(1) EPC in European Patent Application No. 11804304.1 dated Feb. 19, 2018.

\* cited by examiner

| | | |
|---|---|---|
| 502 | MSISDN | 8089435874839473849 |
| 504 | SERVICE PROVIDER | 0001 |
| 506 | SERVICE PLAN | 0037456 |
| 508 | ALLOWED CONTACTS | 4 |
| 510A | NUMBER 1 | 111-111-1111 |
| 512A | NAME 1 | SPOUSE |
| 510B | NUMBER 2 | 222-222-2222 |
| 512B | NAME 2 | CHILD |
| 510C | NUMBER 3 | 333-333-3333 |
| 512C | NAME 3 | JOE SMITH |
| 510D | NUMBER 4 | 444-444-4444 |
| 512D | NAME 4 | SUE JONES |

*Fig. 5.*

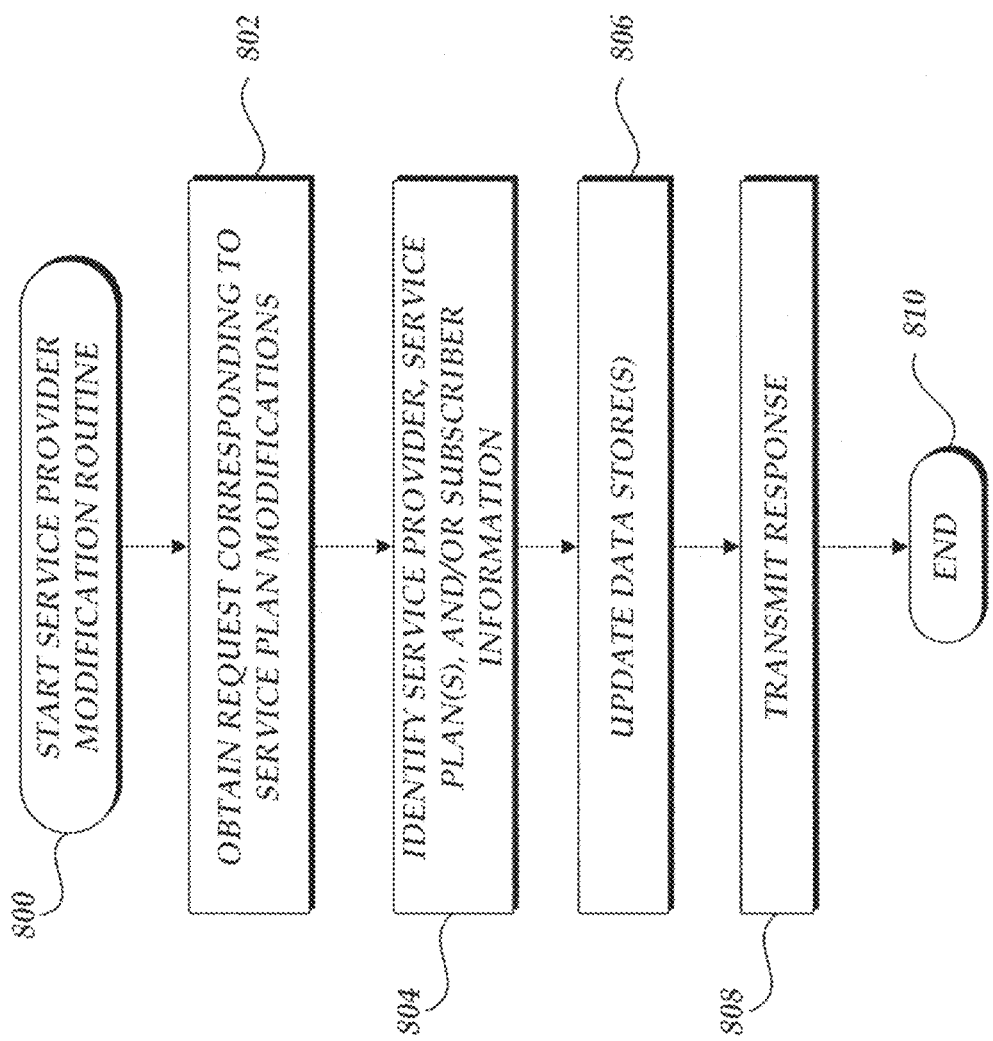

MANAGING SERVICE PROVIDER SERVICE OPTIONS

CROSS REFERENCE TO RELATED APPLICATIONS

This application is a continuation of U.S. application Ser. No. 16/272,892, now U.S. Pat. No. 10,740,812, entitled "MANAGING SERVICE PROVIDER SERVICE OPTIONS" and filed Feb. 11, 2019, which in turn is a divisional of U.S. patent application Ser. No. 12/910,715, now U.S. Pat. No. 10,204,365, entitled "MANAGING SERVICE PROVIDER SERVICE OPTIONS" and filed Oct. 22, 2010, which in turn claims priority to Provisional Application No. 61/362,242 filed on Jul. 7, 2010, the disclosures of which are incorporated herein by reference.

BACKGROUND

Generally described, computing devices and communication networks facilitate the collection and exchange of information. Utilizing a communication network and relevant communication protocols, a computing device can engage in data communications with a wide variety of computing devices. In accordance with a telecommunications-based environment, telecommunications-based devices, such as mobile terminals, establish communications with various computing devices via a wireless communication network provided by a wireless communication service provider.

In one embodiment, users associated with a telecommunications-based device can access and manage one or more services provided by the wireless communication service provider. For example, a user may wish to manage information associated with a user account, such as updating billing information, modifying account particulars or aspects of a wireless service account (e.g., selecting service plans), and the like. In another example, a user may wish to access enhanced services provided by the wireless communication service provider, such as location based services.

In a further specific embodiment, most users of telecommunications-based devices not only rarely change aspects of their service plan with their mobile service provider, but are also rarely aware of new or deleted features associated with their service plan or of new available service plans. These rarities may be attributed to the time and effort required to make changes to service plan options more readily available to consumers, as well as the time and effort required to effect the service plan change. To make a change, a subscriber must typically initiate contact with the service provider via a telephone call to customer service or via a self-help system on the service provider's website. Once contact is initiated, implementing a change can be a multi-step process that takes a certain amount of time to complete and a certain understanding of all of the service plan options to make an informed decision. While most service providers strive to simplify this process, the lack of readily available information regarding new service plan options, as well as the change process, may sometimes discourage subscribers from attempting to make a change to their service on a frequent basis.

Even if a service provider simplifies the process of changing aspects of a subscriber's service plan, the process is often not performed in a subscriber-friendly fashion. Changes are rarely implemented immediately, and may take twenty-four hours or more to propagate through the service provider's systems. Moreover, even if a service provider may have internally identified possible changes to consumer service plan options, such changes to the available service plan options are also rarely implemented and made available to consumers immediately. While most consumers are willing to accept some delay, the lack of immediate knowledge and availability of service plan options, as well as the lack of ability to immediately make corresponding changes, is a sub-optimal experience. Most consumers would prefer a service provider that reduces the time and effort necessary to change a service plan such as by eliminating the need to personally contact the service provider. Most consumers would also prefer a service provider that could more readily make service plan option changes available. If one or more such offerings existed, it is expected that subscribers would more frequently make changes to their service plan and would ultimately be more satisfied with the service that they receive.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIGS. 5 and 6 are block diagrams illustrative of service plan mapping information utilized by a service management component;

FIG. 8 is a flow diagram illustrative of a routine implemented by a service management component for processing service modification requests from a service provider.

THE DETAILED DESCRIPTION

Figure 1:
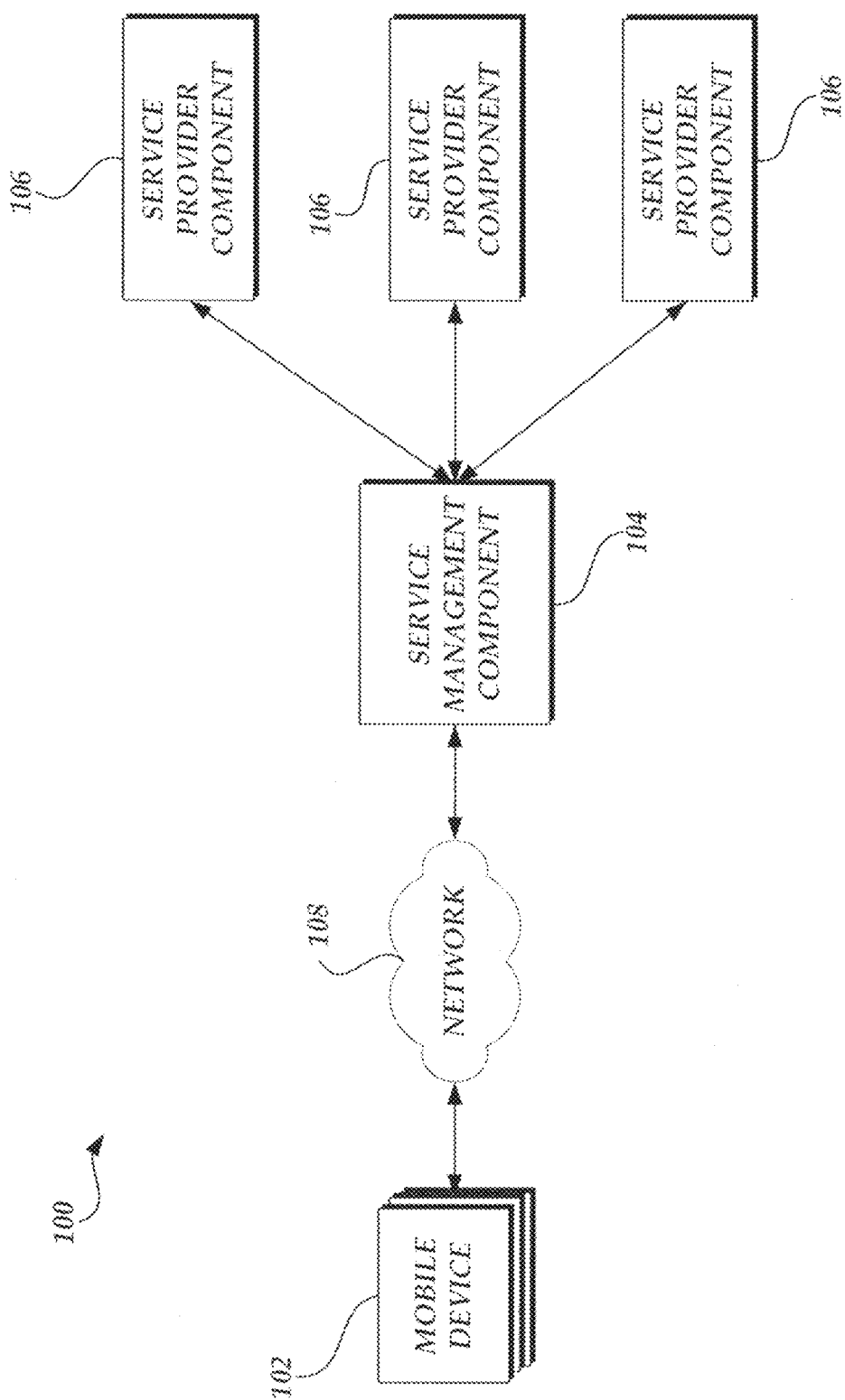
FIG. 1 is a block diagram illustrative of a telecommunication environment including a number of mobile devices, a service management component, and a number of service provider components.

Generally described, aspects of the present disclosure relate to the management of services offered to subscribers by service providers. More specifically, in an illustrative embodiment, aspects of the present disclosure relate to the management of service provider updates to services offered by one or more service providers, such as service plans, and to the availability of these updates to subscribers for making immediate modifications to their individual service plans and/or subscriber accounts via a subscriber's telecommunications-based device. In one embodiment, a service management component manages service plan options that are provided by one or more service providers and that are made available to subscribers. The service management component processes requests from one or more service provider components to dynamically update service plan information. Such requests may include requests to add, delete, or otherwise modify service plans; add, delete, or otherwise modify features associated with a service plan or subscriber account; add, delete, or otherwise modify rule sets associated with a service plan or feature; and the like. In this embodiment, the service management component maintains various data stores associated with available service plans, features, or rule sets and with current subscriber information that facilitate a mapping of updated service plan options to subscribers. Accordingly, the service management component manages a framework that allows the management of the mapping information. In some embodiments, upon updating service plan information received from a service provider component, the service management component notifies subscribers of any updated subscriber-specific service plan options.

In another illustrative embodiment, the service management component manages subscriber requests to modify the subscriber's current service plan and to identify available service plan options. The subscriber may effect changes to his or her service plan or subscriber account features via a telecommunications-based device. In one embodiment, the subscriber may directly enter a modification to an aspect of the subscriber's service plan or account features. The service management component verifies the subscriber's proposed modification against a set of rules that defines acceptable changes to the service plan or account features. If the proposed modification is a valid change, the service management component immediately propagates the change to all service provider components that implement the service plan, such as a service provider billing component. The service management component may also notify the subscriber regarding the status of the modification, such as a notification that the modification was successfully completed. Additionally, the service management component may automatically provide the subscriber with a notification of updated service plan options in response to the initial modification request or in response to any subscriber request made after a service plan update has been completed. Alternatively, in another embodiment, the service management component may provide currently updated service plan information to subscribers upon request.

Although aspects of the present disclosure will be described with regard to an illustrative telecommunication environment and component interactions, communication protocols and flow diagrams, one skilled in the relevant art will appreciate that the disclosed embodiments are illustrative in nature and should not be construed as limiting. Additionally, although the term telecommunication device or mobile device is used in this document, the term represents any type of device having a component for communicating with one or more other devices via one or more communication paths. Such communication paths can include wireless communication paths (via infra-red, RF, optical, terrestrial, or satellite communication media) and wired communication paths. Still further, although the present disclosure references a telecommunications-based device, one skilled in the relevant art will appreciate that a telecommunications-based device may also be referred to as a wireless computing device, a mobile communication device, a mobile terminal, or a computing device. Examples of telecommunication devices or mobile devices are described below with regard to FIG. 1. Accordingly, reference to a telecommunications-based device or mobile device should not be interpreted as including any particular functionality or operation not described in the present disclosure.

With reference now to FIG. 1, an embodiment of an illustrative telecommunication environment 100 will be described. The telecommunication environment 100 can include a number of telecommunications-based devices 102 associated with one or more users. The telecommunications-based device 102 can correspond to a wide variety of devices or components that are capable of initiating, receiving or facilitating communications over a communication network 108 including, but not limited to, personal computing devices, electronic book readers (e.g., e-book readers), hand held computing devices, integrated components for inclusion in computing devices, home electronics, appliances, vehicles, machinery, landline telephones, network-based telephones (e.g., voice over IP ("VoIP"), cordless telephones, cellular telephones, smart phones, modems, personal digital assistants, laptop computers, gaming devices, media devices, and the like. In an illustrative embodiment, the telecommunications-based device 102 include a wide variety of software and hardware components for establishing communications over one or more communication networks, generally referred to as communication network 108, including wireless communication network or a wired communication network (not shown). Illustrative components of a mobile device 102 will be described in greater detail with regard to FIG. 2B.

With continued reference to FIG. 1, the telecommunication environment 100 includes one or more computing devices or systems, generally referred to as a service management component 104, in communication with the mobile devices 102. In an illustrative embodiment, the service management component 104 can maintain data, such as in the form of data tables, that facilitates the management of information to be provided to the mobile devices 102. Specifically, in an illustrative embodiment related to the management of services, and of service plans specifically, the service management component 104 can illustratively maintain one or more data tables identifying available service plans and corresponding service plan features and rule sets. The service management component 104 can also maintain one or more data tables identifying subscriber-specific service plan information. Examples of such data tables will be described with regard to FIGS. 5 and 6. Illustrative components of a service management component 104 will be described in greater detail with regard to FIG. 2A. One skilled in the relevant art will appreciate that the service management component 104 is not limited to any specific structure or component of any one air interface protocol.

The telecommunication environment 100 also includes a number of service provider components 106 in communication with the service management component 104. Illustratively, the service provider components provide services to the mobile devices 102 via requests transmitted over the communication network 108. Moreover, the service provider components 106 may correspond to one or more service providers. As previously indicated, examples of the services provided by the one or more service provider components include, but are not limited to, managing information associated with user accounts, such as updating billing information, modifying account particulars or aspects of a wireless service account (e.g., selecting or modifying service plans and/or service plan or account features or rule sets), and the like. In other examples, the services provided by the one or more service provider components include location based services, identity services, data enhancements services, data processing services, commerce services, and the like. In general, a service provider offers one or mores services which, in the embodiments herein, are also often referred to as back-end processes.

Figure 2A:
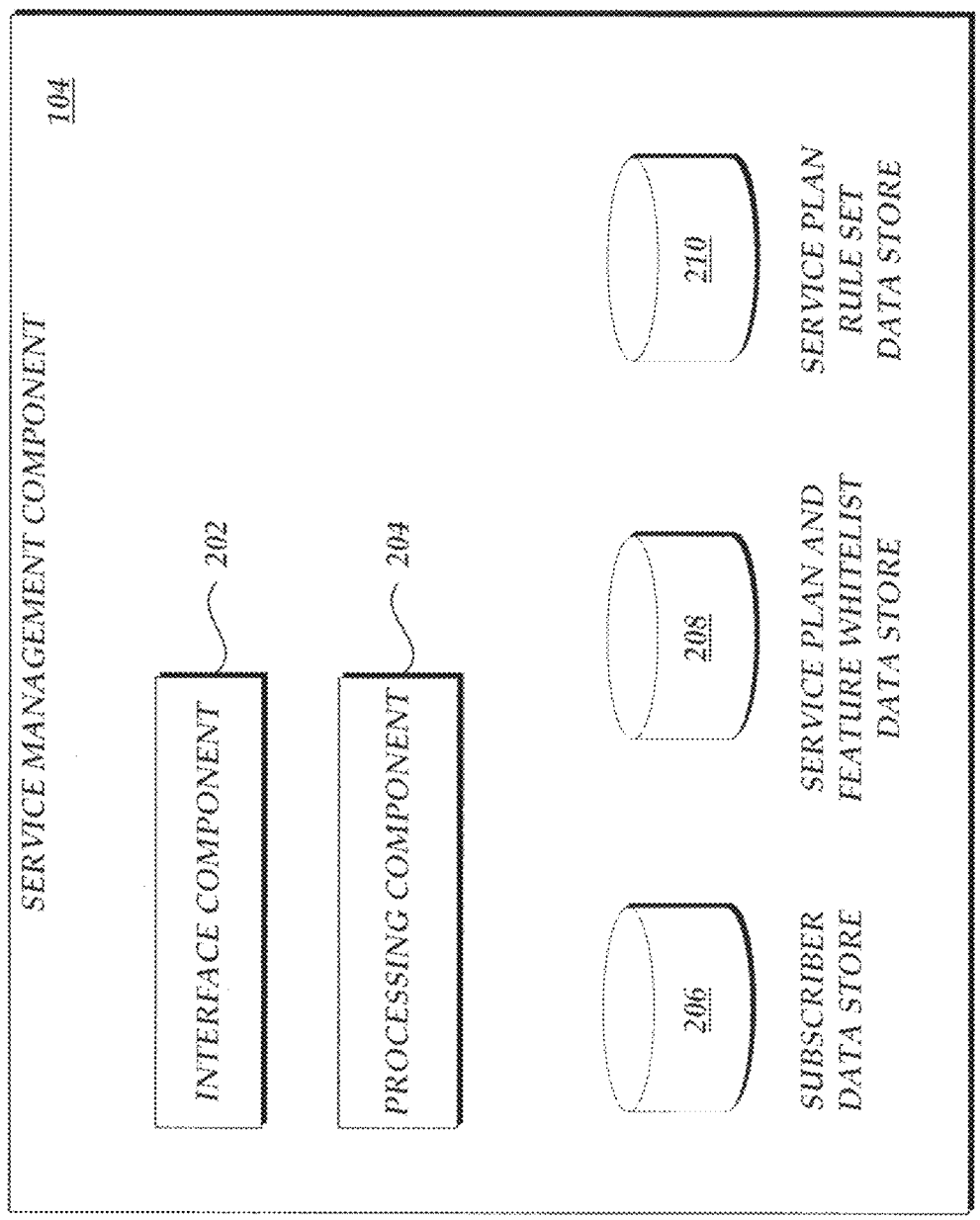
FIG. 2A is a block diagram illustrative of components of a service management component.

With reference now to FIG. 2A, illustrative components of a service management component 104 will be described. As illustrated in FIG. 2A, the service management component 104 can include an interface component 202 for communicating with various components of the telecommunication environment 100. Illustratively, the interface component 202 can communicate with one or more mobile devices 102 via established protocols, such as one or more APIs. Likewise, the interface component 202 can communicate with one or more service provider components 106 via established communication protocols, such as one or more APIs. Although the interface component 202 is illustrated as a single component, one skilled in the relevant art will appreciate that the service interface component 104 may utilize separate components to communicate with different components of the telecommunication environment 100.

The service management component 104 also includes a processing component 204 for processing requests from both a mobile device 102 and a service provider component 106. In one embodiment, the processing component 204 processes requests from one or more service provider components 106 to dynamically update information regarding services provided by the one or more service provider components 106. Illustratively, the updated information may pertain to updates for service plan information. A request to update service plan information may include a request to add, delete, or otherwise modify service plans; add, delete, or otherwise modify features associated with a service plan or subscriber account; add, delete, or otherwise modify rule sets associated with a service plan or feature; and/or the like. For ease of reference, such requests will generally be referred to as service plan modification requests or service plan update requests, while the corresponding updates will generally be referred to as service plan updates or service plan modifications which result in updated service plan options being available. As soon as the service plan updates are made available by a service provider component 106 and received at the service management component 104, the processing component 104 dynamically updates the service plan information making the associated service plan options available to subscribers. Service plan options generally refer to any options associated with a service plan that are available to subscribers or service provider customers including, but not limited to, new or modified service plans themselves, new or modified features that can supplement or be added to a service plan or are otherwise associated with a subscriber account with the service provider, and the like.

The processing component 204 also processes requests made via a mobile device 102 to modify services, such as a service plan, to which a user of the mobile device 102 currently subscribes or to identify other available services, such as new features that can supplement or be added to a service plan or are otherwise associated with a subscriber account with the service provider. Such requests are also generally referred to as service plan modification requests or service plan update requests. In yet another embodiment, the processing component 204 may also process a variety of notifications regarding service plan inquiries and modifications initiated by either a service provider component 106 or a mobile device 102.

As previously discussed, the service management component 104 maintains one or more data stores for facilitating the processing of service plan modification requests made by either a service provider component 106 or mobile device 102, as generally described above. Specifically, in one embodiment, and as will be further described below, the service management component 104 maintains the one or more data stores to facilitate a mapping of updated service plan options to subscribers. Illustratively, the service interface component 104 includes a subscriber data store 206 for identifying subscriber-specific service plan information, such as a current service plan to which a mobile device user subscribes. The service management component 104 also maintains a service plan and feature whitelist data store 208 and a service plan rule set data store 210 for identifying available service plans; service plan features which are included in the service plan, which can be added to the service plan, or which can supplement the service plan as a stand alone feature such as international roaming; and corresponding rule sets. Although the subscriber data store 206, the service plan and feature whitelist data store 208, and service plan rule set data store 210 are each illustrated as a single data store, one skilled in the relevant art will appreciate that each data store may be made up of any number of data stores, databases, or files. Additionally, the subscriber data store 206, the service plan and feature whitelist data store 208, and service plan rule set data store 210 may be implemented in a distributed manner via a communication network, such as the Internet or private network.

One skilled in the relevant art will appreciate that the service management component 104 and its various components may be implemented by one or more computing devices, or a computing system. Each of the computing devices may include one or more processing units, such as one or more CPUs. The computing devices may also include system memory, which may correspond to any combination of volatile and/or non-volatile storage mechanisms. The system memory may store information which provides an operating system component, various program components, program data, and other components. The computing devices may also include one or more input devices (keyboard, mouse device, specialized selection keys, etc.) and one or more output devices (displays, printers, audio output mechanisms, network interfaces, etc.). The computing devices perform functions by using the processing unit(s) to execute instructions provided by the system memory. The above-enumerated list of components is representative and is not exhaustive of the types of functions performed, or components implemented, by a computing device. One skilled in the relevant art will appreciate that additional or alternative components may also be included in a computing device, or computing system made up of one or more computing devices, to carry out other intended functions of the service management component.

Figure 2B:
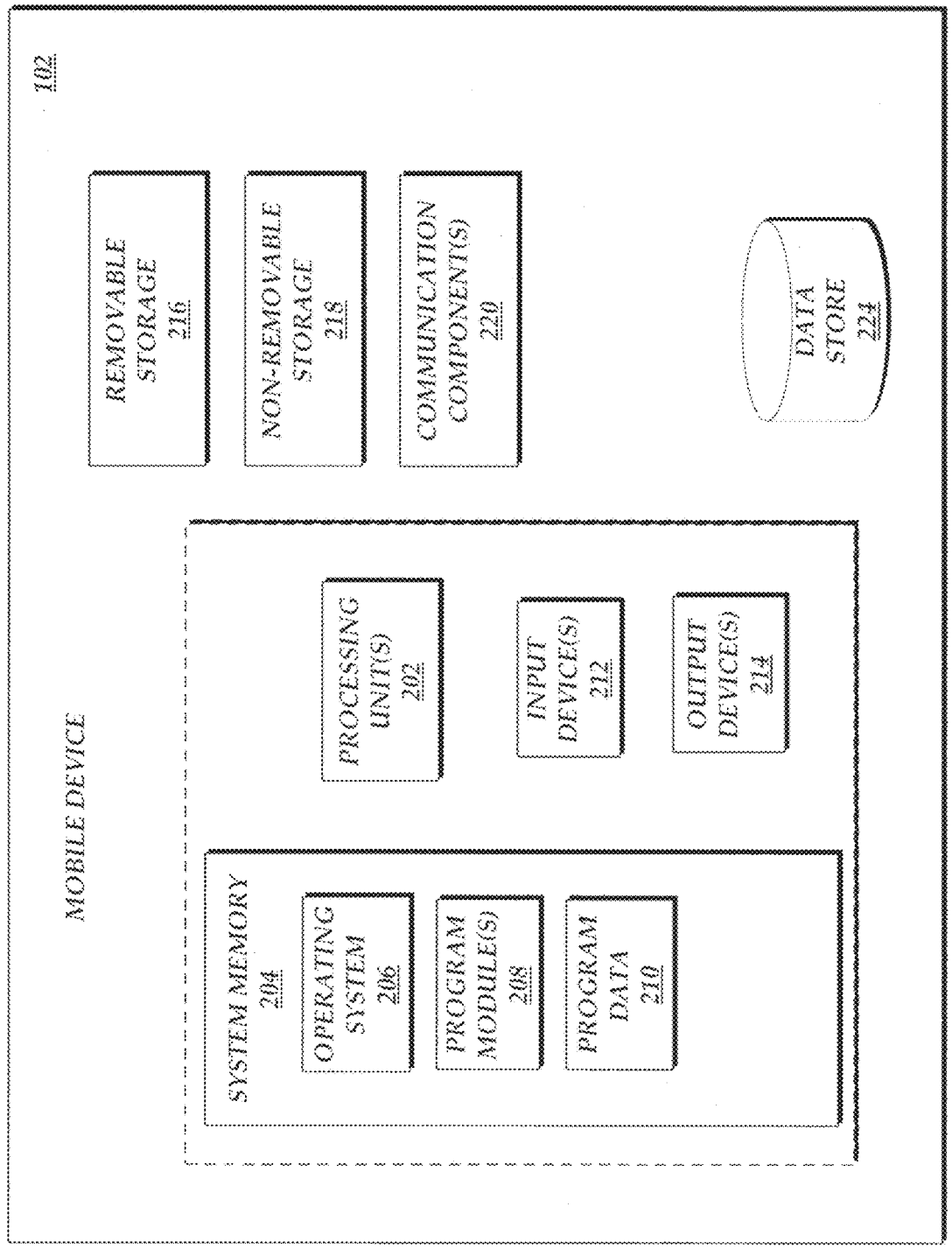
FIG. 2B is a block diagram illustrative of components of a telecommunication device.

With reference now to FIG. 2B, illustrative components of a telecommunication device, such as a mobile device 102, for use in receipt of service update notifications and for use in the generation of service update inquiries and service plan modification requests will be described. The mobile device 102 may include one or more processing units 202, such as one or more CPUs. The mobile device 102 may also include system memory 204, which may correspond to any combination of volatile and/or non-volatile storage mechanisms. The system memory 204 may store information which provides an operating system component 206, various program components 208, program data 210, and other components. The above-enumerated list of components is representative and is not exhaustive of the types of functions performed, or components implemented, by the mobile device 102. One skilled in the relevant art will appreciate that additional or alternative components may also be included in the telecommunications-based device 102 to carry out other intended functions such as a mobile telephone functions. The mobile device 102 performs functions by using the processing unit(s) 202 to execute instructions provided by the system memory 204. The mobile device 102 may also include one or more input devices 212 (keyboard, mouse device, specialized selection keys, etc.) and one or more output devices 214 (displays, printers, audio output mechanisms, etc.).

With continued reference to FIG. 2B, the mobile device 102 may also include one or more types of removable storage 216 and one or more types of non-removable storage 218. Still further, the mobile device 102 can include communication components 220 for facilitating communication via wired and wireless communication networks, such as the wireless communication network 104 and data network 118 (FIG. 1). Examples of various communication protocols include, but are not limited to, Bluetooth, the family of IEEE 802.11 technical standards ("WiFi"), the IEEE 802.16 standards, short message service ("SMS"), voice over IP ("VoIP") as well as various generation cellular air interface protocols (including, but not limited to, air interface protocols based on CDMA, TDMA, GSM, WCDMA, CDMA2000, TD-SCDMA, WTDMA, LTE, OFDMA, WiMAX, and similar technologies).

Figure 3:
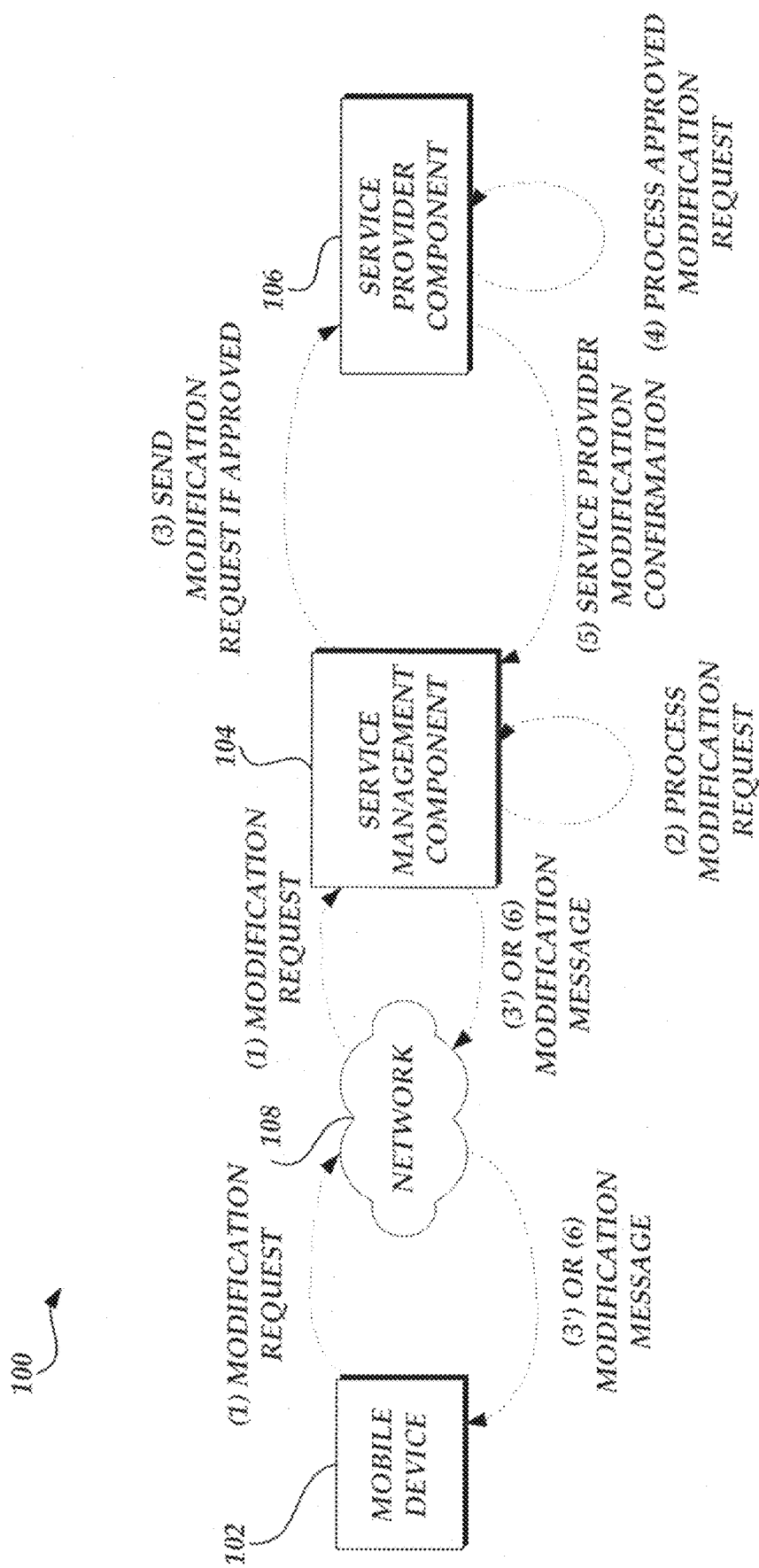
FIG. 3 is a block diagram of the telecommunication environment of FIG. 1 illustrating an embodiment for the processing of service modification requests from a mobile device.

Turning now to FIG. 3, a block diagram of the telecommunication environment 100 of FIG. 1 illustrating an embodiment for the processing of mobile device service modification requests by the service management component 104 will be described. As illustrated in FIG. 3, a mobile device 102 transmits a service modification request, e.g., a service plan modification request, to the service management component 104 via the communication network 108. In this illustrative embodiment, the service plan modification request may be transmitted via an established protocol, such as an API. The service management component 104 processes the request based in part on a set of rules corresponding to the service plan the subscriber is seeking to modify.

For purposes of this disclosure, one representative service plan is a group-centric service plan. In a group-centric plan, a subscriber is allowed to define a set of contact numbers in a contact group. A contact number can represent either a person or a service, for example, a service that receives emailed images and automatically prints the received image. Communications made between the subscriber and any of the contact numbers in the contact group are billed at a different rate than communications with contact numbers that are not in the contact group. For example, the subscriber may be billed at a flat rate for all communications with members in the contact group, at a discount for each communication with members in the group, or all communications with members in the group might be free. Alternatively, communications made between the subscriber and any of the contact numbers in the contact group may be provided with preferential service or a feature that is not accessible to communications with contact numbers that are not in the contact group. For example, the subscriber may be provided with the ability to simultaneously broadcast the same message to members of his or her contact group, but not to members outside of his or her contact group. As another example, the subscriber may be provided with special ringtones for members of his or her contact group. In this context, "communication" means the transmission or receipt by the subscriber of any voice call, text, SMS message, instant message, email, picture, music, or any other data. The size of the contact group may vary significantly but often the group contains twenty or less contact numbers. Moreover, members of the group can be associated with any telecommunication network, whether wired or wireless. Additional information about a group-centric service plan is described in greater detail in U.S. Pat. No. 7,685,530, entitled "Preferred Contact Group Centric Interface," filed on Apr. 10, 2006 and incorporated in its entirety by this reference. While a group centric-service plan is used as a representative service plan in this disclosure, it will be appreciated that the technology described herein is applicable to many other types of service plans, and indeed other types of services.

Mobile devices 102 may include a service client that uniquely identifies the subscriber and that interfaces with the subscriber management component 104. The service client may also maintain a record of certain subscriber-modifiable elements or features of a subscriber-selected service plan. For example, in an embodiment wherein the service plan is a group-centric service plan, the service client includes a table that identifies all of the contacts in a subscriber's contact group. FIG. 5 is a representative service plan table 500 that is maintained by the service client and/or the service management component 104 in a subscriber data store 206 as described above. The table includes a number of fields that pertain to a subscriber's currently selected service plan, including: a Mobile Subscriber ISDN Number field 502, which contains a number that uniquely identifies the subscriber to the service provider; a service provider field 504, which contains a number or any other identifier that uniquely identifies the service provider; a service plan field 506, which contains a number or any other identifier that uniquely identifies a subscriber's currently active service plan; an allowed contacts field 508, which contains a number that sets the size of (i.e., the number of contacts in) the contact group; and group contact name and number fields 512A-D and 510A-D respectively, which identify contacts by subscriber-defined names and contact numbers. The contact number may be a phone number, an IP address, or any unique identifier that can be used to complete a communication with another person or service. The subscriber-specific service plan table 500 is maintained by the service client at the mobile device 102 and/or the service management component 104, and modifications to the service plan table 500 are made in accordance with the processes described below.

If a user of a mobile device 102 has subscribed to a group-centric service plan, one of the aspects or features of the plan that the subscriber is allowed to manage is the composition of the contact group. When the group-centric plan is activated for a subscriber, the group contact name and number fields 512A-D and 510A-D may be populated with zeros as an initial state, signifying that the subscriber has no contacts. After activation, the subscriber is allowed to populate the contact name and number fields with a desired group of people or services and manage the composition of the group over time. Information about the user interface that may be incorporated in the mobile device 102 to allow subscribers to modify the composition of their contact group is described in greater detail in the previously-referenced U.S. Pat. No. 7,685,530 entitled "Preferred Contact Group Interface." The subscriber is allowed to add new contacts into his or her group contact name and number fields, change the contact number of contact name of existing contacts, and delete contacts from his or her contact group by making a modification request to the service management component 104.

As mentioned above, the subscriber-specific service plan table 500 may, additionally or alternatively, be maintained by the service management component 104 in subscriber database 206. As also described above, the service management component 104 further maintains service plan rule set information in data store 210. The service plan rule set information defines those conditions under which the subscribers may modify their service plan. For example, for the group-centric service plan, a subscriber may only be allowed to modify his or her contact group after initial subscriber designation a select number of times in a given time period. Accordingly, in this illustrative embodiment, the subscriber-specific service plan table maintained by the service management component 104 in the subscriber data store 206 may also include other fields beyond those depicted in FIG. 5. For example, the service plan table may include time stamp fields and records of prior modifications in order to facilitate the service management component's determination of whether a modification to a group contact is permissible per the associated service plan rule set information.

While FIG. 5 depicts a table having contents and an organization which are designed to make it more comprehensible to the human reader, those skilled in the art will appreciate that the actual data structure(s) used by the system to store this information may differ from the tables shown, in that they, for example, may be organized in a different manner, may contain more or less information than shown, may be compressed and/or encrypted, and may be optimized in a variety of ways.

Returning to FIG. 3, when a modification request is received by the service management component 104, it is acted on in substantially real-time to either implement the modification request or to reject the modification request if it fails to satisfy the rules that govern allowed modifications. The service management component 104 processes the modification request utilizing the information in data stores 206, 208, and 210 as set forth above and as will be further described below.

If the modification request is denied by the service management component 104, such as in the case where the corresponding service plan rule set does not permit the requested change, the service management component 104 transmits a message to the mobile device 102 indicating that the request was denied. In addition or alternatively, the rule set may direct the service management component 104 to connect a user of the mobile device to a service provider customer care representative to, for example, explain why the modification request is not permitted. Similarly, the rule set may additionally or alternatively direct the service management component 104 to provide the mobile device with a link to plan limitations for purposes of enabling a user of the mobile device to determine why the request was not permitted.

Even further, together or separate from the modification denied message, the service management component 104 may also provide a message to the mobile device 102 identifying any updates to service plan options that were made at the service management component 104 since the mobile device's last request or inquiry to the service management component 104. Yet further, the service management component 104 may alternatively provide such a service plan update message to the mobile device 102 automatically upon any inquiry or request made by the mobile device 102 to the service management component 104. In this way, the user of the mobile device 102 will be immediately notified of any updated service plan options responsive to initiating communication with the service management component 104.

If the modification request is approved or confirmed by the service management component 104, the service management component 104 identifies one or more service provider components 106 to receive the modification request and transmits the approved modification request to the identified service provider component 106. The transmission of the approved modification request may be transmitted in accordance with an established protocol, such as an API. The service provider component 106 processes the approved modification request and generates a response. The response is transmitted to the service management component 104 via an established protocol, such as an API. The response can include a confirmation that the service provider component 106 has also processed the modification request for use in subsequent processing, such as billing the subscriber in accordance with a new service plan. In this embodiment, responsive to receipt of the response from the service provider component 106, the service management component 104 may then transmit a message to the mobile device 102 indicating that the update request was confirmed and implemented.

Figure 4:
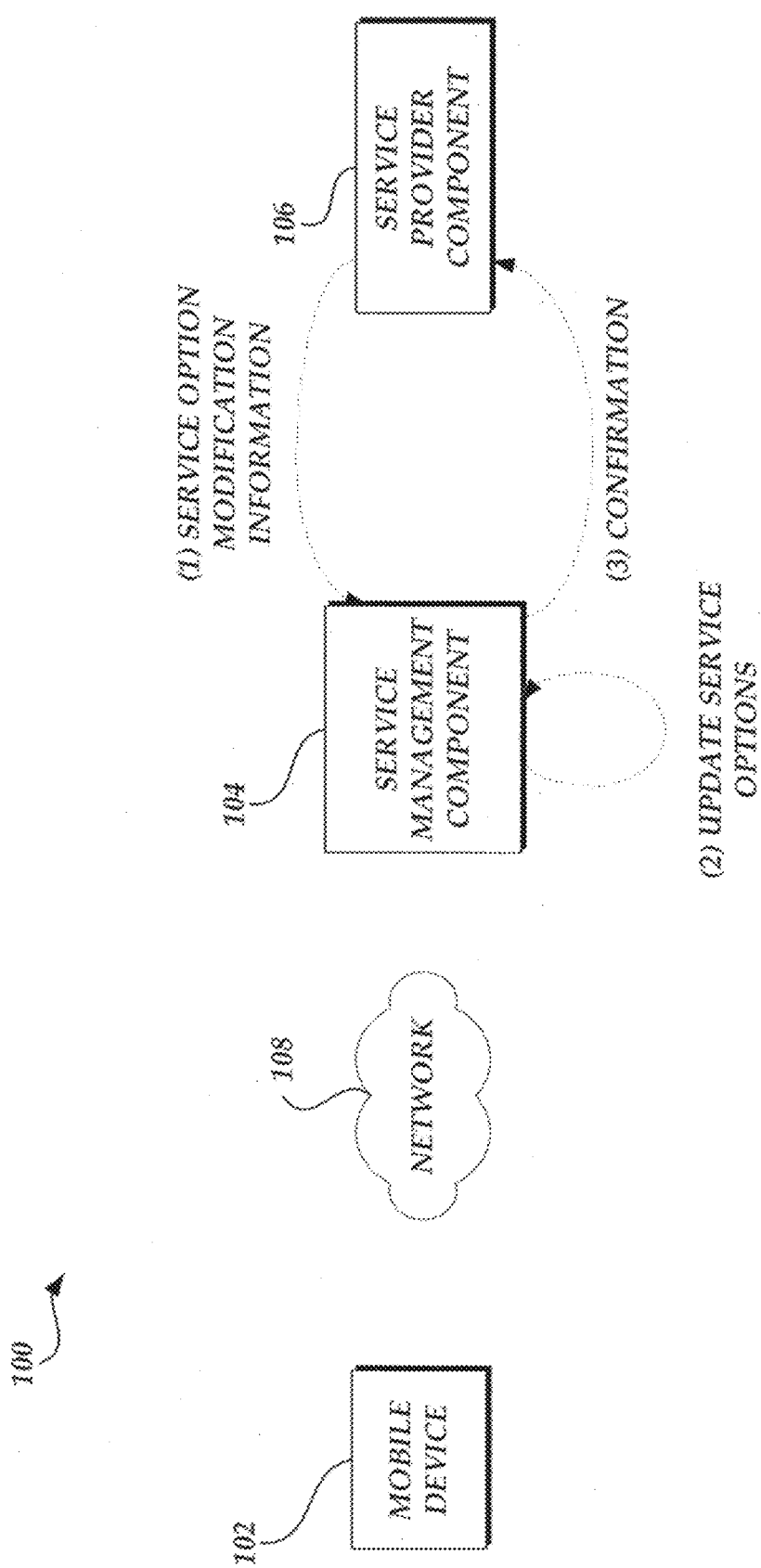
FIG. 4 is a block diagram of the telecommunication environment of FIG. 1 illustrating an embodiment for the processing of service modification requests from one or more service providers.

With reference now to FIG. 4, a block diagram of the telecommunication environment 100 of FIG. 1 illustrating an embodiment for the processing of service modification requests from one or more service provider components 106 by the service management component 104 will be described.

As illustrated in FIG. 4, a service provider, such as via a service provider component 106, transmits a service modification request, e.g., a service plan modification request, to the service management component 104. In this illustrative embodiment, the service plan modification request may be transmitted via an established protocol, such as an API. A service plan modification request may include a request to add, delete, or otherwise modify service plans; add, delete, or otherwise features associated with a service plan; add, delete, or otherwise modify rule sets associated with a service plan or feature; and/or the like. The information provided by the service provider component 106 to effect such a modification is generally referred to herein as service option modification information. Based on the receipt of the service option modification information from the service provider component 106, the service management component 104 dynamically updates service plan options by processing the request and modifying the one or more of the data stores 206, 208, and 210. In this way, the service management component 104 facilitates the immediate availability of updated service plan options as soon as they are ready to be offered by the service provider component. The service management component 104 may optionally transmit an acknowledgment or confirmation to the service provider component identifying that the update is complete. Based on the dynamically updated information, subsequent inquiries and/or requests from a mobile device 102 will result in the mobile device 102 immediately receiving updated information regarding available service plan options. In addition or alternatively, responsive to completion of one or more service plan option updates at the service management component 106, the service management component 106 may automatically send a notification message to one or more mobile devices 102 regarding the updated service plan options.

In yet another embodiment, and as will be described further below, the service management component 104 dynamically updates service plan options in the service plan and feature whitelist data store 208 and/or the service plan rule set data store 210 (FIG. 2A) such that updated service plan options are mapped to specific subscribers to which the updated service plan options are available. In this embodiment, based on the dynamically updated information and the mapping information, the service management component 104 may also immediately transmit a message to mobile devices 102 notifying subscribers of updates specifically applicable to the subscriber, such as changes to the subscriber's current service plan, identification of new service plans and/or features specifically available to the subscriber, and/or the like. In this way, the service management component 104 manages a framework that allows the management of the mapping information.

Figure 6:
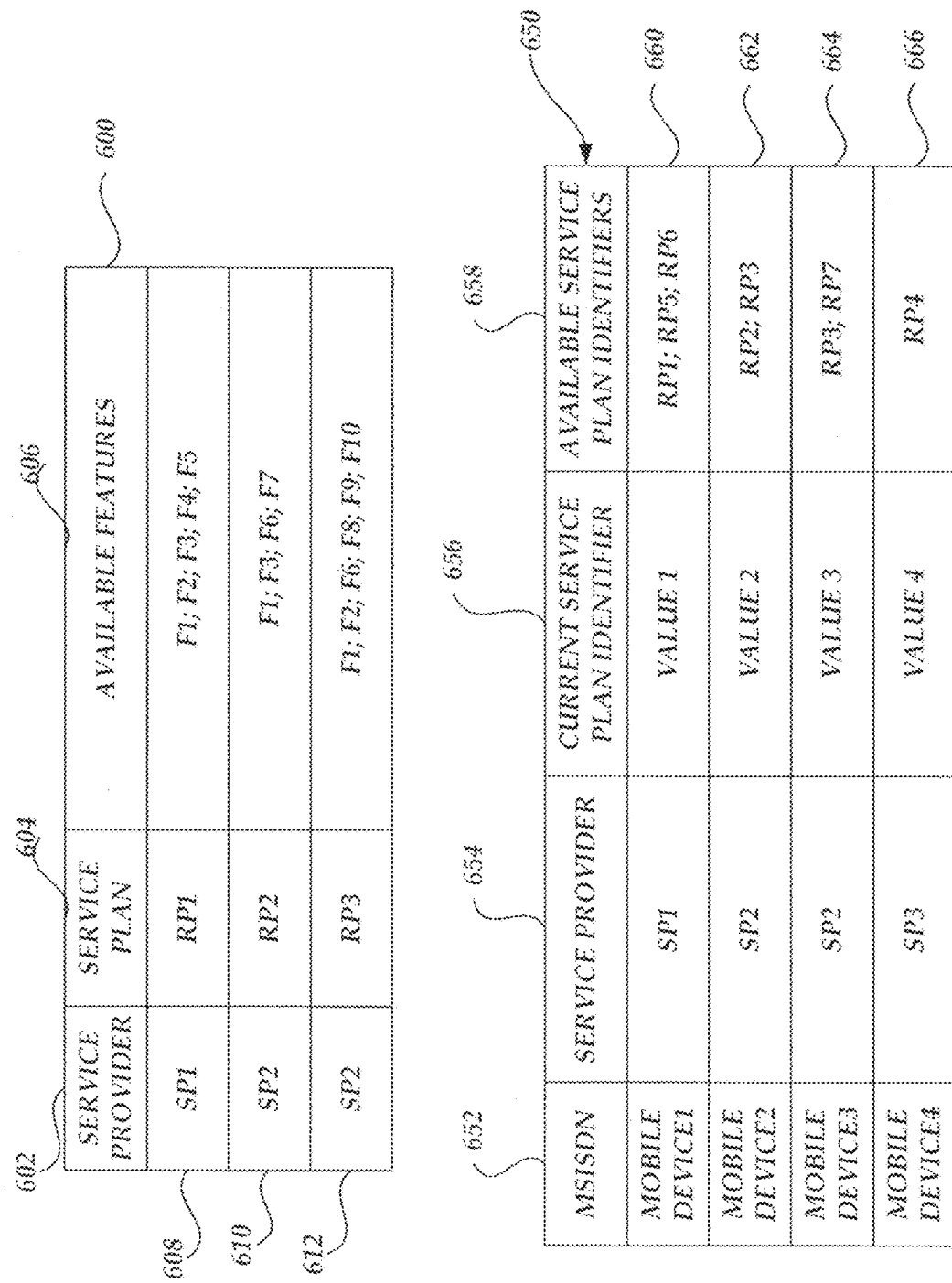

With reference now to FIG. 6, a block diagram illustrative of various information utilized by a service management component 104 for updating service plan options available to users of mobile devices 102 will be described. The information includes an illustrative service plan and feature whitelist data table 600 for maintaining service plan options. In one embodiment, the service plan and feature whitelist data table 600 includes a first column 602 for maintaining service provider identifiers, which can be utilized, for example, to match subscribers to available service plans offered by their respective service plan providers and/or to provide service plan updates to subscribers, such as identification of new or modified features to their service plans. In this embodiment, the service management component 104 is maintained by a third party service with multiple service providers utilizing the service management component 104. However, in other embodiments, the service provider column 602 may not be necessary such as where the service management component 104 manages a service plan options of a single service provider.

With continued reference to the service plan and feature whitelist data table 600, column 604 includes service plan identifiers and column 606 includes available features associated with the corresponding identified service plans. The service plan and feature whitelist data table 600 includes three illustrative rows 608, 610, and 612 that correspond to one or more service plans offered by two different service providers, wherein each service plan has one or more associated features. While not illustrated, the service plan and feature whitelist data table 600 may also include other fields, such as time stamp fields to identify timing of when updates to the service plan and/or any of its associated features were made. In this way, the service management component 104 may utilize the service plan and feature whitelist data table 600 to, for example, provide notifications to subscribers of new updated service plan options.

With reference again to FIG. 6, the information utilized by a service management component 104 for updating service plan options available to users of mobile devices 102 may also include a service plan availability table 650 for providing updates available to particular mobile devices 102. The service plan availability table 650 includes a first column 652 for identifying specific mobile devices 102. The service plan availability table 650 may also include a column 654 for identifying the service provider corresponding to each mobile device 102. As similarly set forth above in reference to table 600, if the service management component 104 manages service plan options for a single service provider, column 654 in table 650 may also be eliminated.

The service plan availability table 650 may further include column 656 for identifying a current service plan identifier corresponding to a service plan currently activated for each associated mobile device. The service management component 104 may map the current service plan identifier information in column 656 to available features, and thus to updates for such features, identified for the same service plan identifier provided in the service plan and feature whitelist data table 600. Alternatively, the service management component 104 could utilize the mobile device identifier information in column 652 to map to the mobile device's currently activated service plan identifier provided in the subscriber's service plan table 600 which is maintained in the subscriber data store 206 and illustrated in FIG. 5. Then, the service management component 104 could map the current service plan identifier information provided in the subscriber data store 206 for the particular subscriber to corresponding available features, and thus to updates for such features, identified for the same service plan identifier provided in the service plan and feature whitelist data table 600. In this case, the current service plan identifier column 656 of the service plan availability table 650 in FIG. 6 may also be eliminated.

Finally, the service plan availability table 650 includes a column 658 for identifying any services, such as service plans, available for a particular mobile device or mobile device type. For example, a mobile device type may be described or organized in terms of manufacturer, operating system, supported air interface, software applications, or other common components. This embodiment contemplates the case in which not all of the services, or service plans, provided by a service provider are available to each mobile device 102, such as when the types of the mobile devices 102 differ. The service plan availability data table 650 includes four illustrative rows 660, 662, 664, and 666 that correspond to the currently available service plans for each of four different mobile devices 102. The service management component can thus utilize service plan availability table 650 to immediately provide notifications to subscribers regarding any updated service plans and/or service plan features available specifically to the mobile device 102 or mobile device type.

While FIG. 6 depicts tables having contents and an organization which are designed to make it more comprehensible to the human reader, those skilled in the art will appreciate that the actual data structure(s) used by the system to store this information may differ from the tables shown, in that they, for example, may be organized in a different manner, may contain more or less information than shown, may be compressed and/or encrypted, and may be optimized in a variety of ways.

Figure 7:
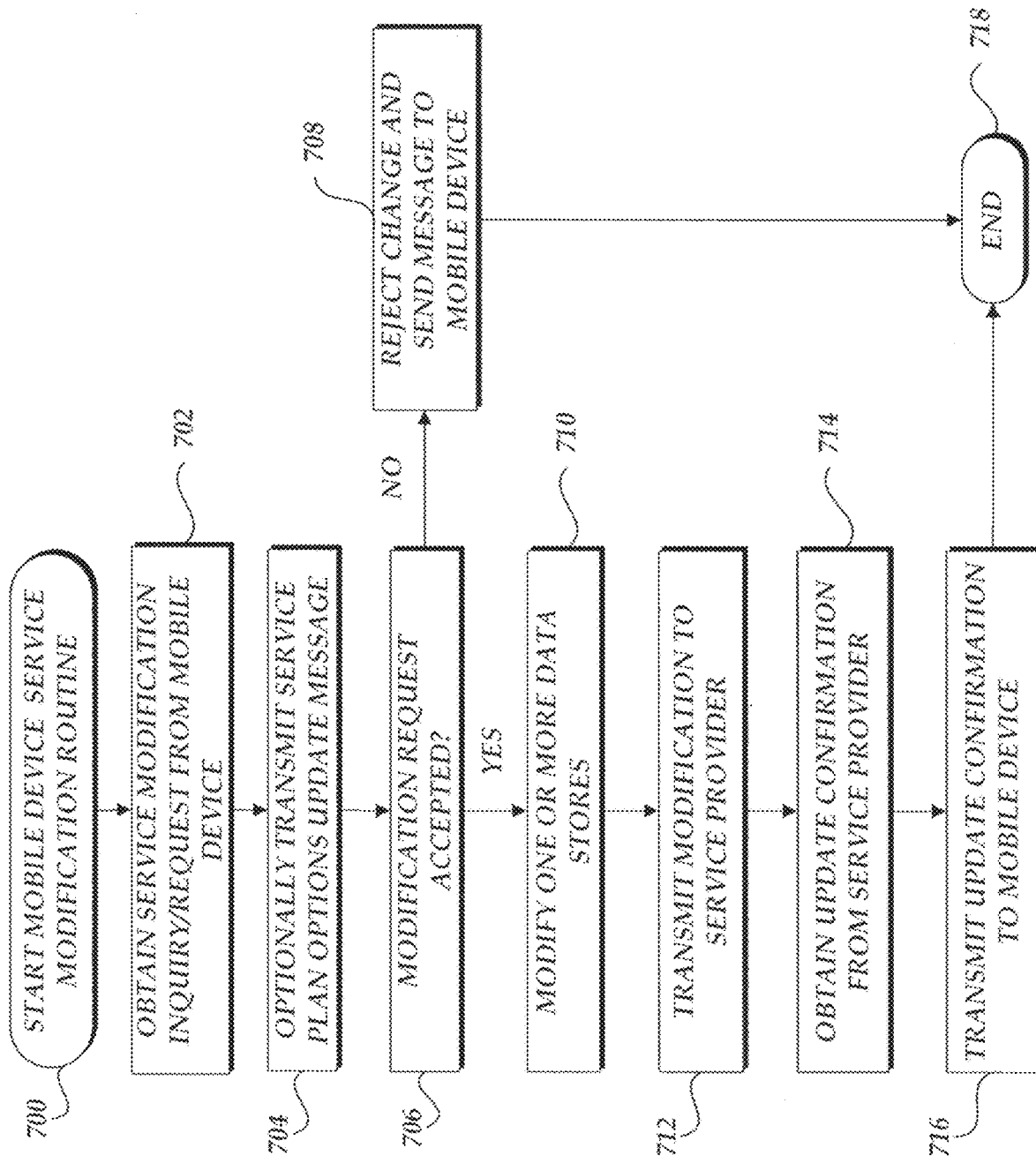
FIG. 7 is a flow diagram illustrative of a routine implemented by a service management component for processing service modification requests from a mobile device.

Turning now to FIG. 7, a flow diagram illustrative of a mobile device service modification request processing routine 600 implemented by a service management component 104 will be described. At block 702, the service management component 104 obtains a service modification inquiry and/or request from a mobile device 102 or any other type of inquiry or request from the mobile device 102. As previously described, in an illustrative embodiment, the service modification request may be obtained via an established communication protocol, such as API. At block 704, the service management component 104 optionally transmits, or causes transmission of, a notification message to the mobile device 102 identifying any updates to service plan options that were made at the service management component 104 since the mobile device's last request or inquiry to the service management component 104. This transmitted notification message may automatically be provided to the mobile device 102 upon any inquiry and/or request made by the mobile device 102 to the service management component 104. In this way, the user of the mobile device 102 will be immediately notified of any updated service plan options responsive to initiating communication with the service management component 104. Additionally, this transmitted notification message may include updates to service plan options that are available specifically for the mobile device making the inquiry or request. In one embodiment, the service management component 104 processes the inquiry or request by mapping a mobile device identifier corresponding to the mobile device making the inquiry or request to updated service plan options. The service management component 104 may then automatically send a notification message to the mobile device providing information associated with updated service plan options that are specifically available to the mobile device.

At a decision block 706, the service management component 104 determines whether the mobile device service modification request can be accepted. This determination may be based in part on a set of rules corresponding to the service plan the mobile device 102 is seeking to modify. Service rules are defined by the service provider to set limits on what actions a subscriber may take in changing aspects of his or her service plan and/or features associated with the subscriber's account with the service provider. For example, for a group-centric service plan, in some embodiments, the service provider may set a rule that each contact in the contact group cannot be modified more than once a month or once every X days. In other embodiments, a rule may be set that a subscriber can only make a certain number of modifications a month (e.g., five). Subscribers may therefore decide whether to change one contact multiple times or multiple contacts one (or more) times. The service plan rule sets are stored in the service plan rule set data store 210 and are accessed by the service management component 104.

If the modification request is denied by the service management component 104, such as in the case where the corresponding service plan rule set does not permit the requested change, the service management component 104 rejects the change and transmits, or causes transmission of, a message to the mobile device 102 indicating that the request was denied at block 708. Alternatively, if the modification request is approved or confirmed by the service management component 104, the service management component 104 modifies one or more of the data stores 206, 208, 210 at block 710. Next, at block 712, the service management component 104 identifies one or more service provider components 106 to receive the approved modification and transmits, or causes transmission of, the approved modification to the identified one or more service provider components 106. The transmission of the approved modification may be transmitted in accordance with an established protocol, such as an API.

At block 714, the service management component 104 obtains a response from the one or more service provider components 106 confirming that the approved modification has been processed by the one or more service provider components 106. The response is obtained at the service management component 104 via an established protocol, such as an API. Next, at block 716, the service management component 104 transmits, or causes transmission of, a message to the mobile device 102 indicating that the update request was confirmed and implemented. At block 718, the routine 700 terminates.

With reference now to FIG. 8, a flow diagram illustrative of a service provider modification request processing routine implemented by a service management component 104 will be described. At block 802, the service management component 104 obtains a modification request from a service provider component 106 corresponding to one or more service plan options offered by the service provider component 106. As previously described, the request can include a request to add, delete, or otherwise modify service plans; add, delete, or otherwise modify features associated with a service plan; add, delete or otherwise modify rule sets associated with a service plan; and/or the like. As also previously described, the obtained information to effect such a modification is generally referred to as service option modification information. At block 804, the service management component 104 identifies all relevant service provider information, service plan information, and/or subscriber information stored in one or more data stores 206, 208, and 210 that may need to be updated.

At block 806, the service management component 104 dynamically updates the appropriate data stores corresponding to the request. In this way, the service management component 104 facilitates the immediate availability of updated service plan options as soon as they are ready to be offered by the service provider component. While not illustrated in FIG. 8, blocks 802-806 may be repeated for additional modification requests. These additional modification requests can be made by the same service provider component, different service provider components associated with a single service provider, or different service provider components corresponding to different service providers. Each modification request may modify various one or more service plan options.

At block 808, the service management component 104 transmits, or causes transmission of, one or more messages. For example, the service management component 104 may transmit an acknowledgment or confirmation to the service provider component identifying that the update is complete. In addition or alternatively, responsive to completion of one or more service plan option updates at the service management component 106, the service management component 106 may automatically transmit a notification message to one or more mobile devices 102 regarding the updated service plan options. As similarly set forth above with respect to blocks 802-806 and while not illustrated in FIG. 8, block 810 may be repeated for additional modification requests. At block 810, the routine 800 terminates.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof. As such, reference in the disclosure to actions performed by a module or component relates to the execution of executable instructions by a processing device, or devices, to cause the referenced action to be preformed.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented system comprising:
    one or more databases including at least:
        service provider information mapping a plurality of service providers to respectively offered service plan features associated with a service plan; and
        service plan information mapping one or more service plans to wireless service accounts associated with users of mobile devices, wherein service plans mapped to at least a portion of the respective wireless accounts include a current service plan for the respective wireless account and at least one other service plan for which the respective wireless account qualifies; and
    a computing device in communication with said one or more databases that is operative to:
        obtain, via an established protocol, a modification request initiated by a first service provider for modifying one or more service plan features associated with the first service provider;
        responsive to the modification request initiated by the first service provider:
            identify, based at least in part on the modification request, at least one of service provider information or service plan information to be updated in the one or more databases; and
            update the one or more databases, wherein the updated one or more databases include one or more updated service plan features based at least in part on the modification request;
        obtain, via an established protocol, a request from a first mobile device;
        process the request from the first mobile device to identify updated service plan features available to the first mobile device, wherein processing the request includes mapping a mobile device identifier to information corresponding to updated service plan features; and
        cause transmission of information associated with the identified updated service plan features to the first mobile device.

2. The computer-implemented system as recited in claim 1, wherein the request from the first mobile device corresponds to a request to update the wireless service account associated with the first mobile device.

3. The computer-implemented system as recited in claim 2, wherein the update request comprises a request to delete a service plan feature associated with the wireless service account associated with the first mobile device.

4. The computer-implemented system as recited in claim 1, wherein the request from the first mobile device corresponds to an inquiry corresponding the wireless service account associated with the first mobile device.

5. The computer-implemented system as recited in claim 1, wherein the modification request initiated by the first service provider corresponds to a request for one or more of: adding a feature to a service plan, deleting a feature from a service plan, or modifying a feature of a service plan.

6. The computer-implemented system as recited in claim 1, wherein the computing device in communication with said one or more databases is further operative to:
    obtain, via an established protocol, a modification request initiated by a second service provider for modifying one or more service plan features associated with the second service provider; and
    responsive to the modification request initiated by the second service provider:
        identify, based at least in part on the modification request initiated by the second service provider, at least one of service provider information or service plan information to be updated in the one or more databases; and
        dynamically update the at least one of service provider information or service plan information based on the modification request initiated by the second service provider.

7. The computer-implemented system as recited in claim 1, wherein the computing device in communication with said one or more databases is further operative to:
    obtain, via an established protocol, a second request from a second mobile device, wherein the second request is associated with service plan features available to the second mobile device;
    process the second request from the second mobile device to identify updated service plan features available to the second mobile device, wherein processing the request includes mapping a mobile device identifier corresponding to the second mobile device to information corresponding to updated service plan features; and
    cause transmission of information associated with the identified updated service plan features to the second mobile device.

8. The computer-implemented system as recited in claim 7, wherein the updated service plan features available to the second mobile device are different from the updated service plan features available to the first mobile device.

9. The computer-implemented system as recited in claim 7, wherein the request from the second mobile device corresponds to a request to update the wireless service account associated with the second mobile device.

10. The computer-implemented system as recited in claim 7, wherein the request from the second mobile device corresponds to an inquiry corresponding the wireless service account associated with the second mobile device.

11. A computer-implemented method comprising:
    obtaining, via an established protocol, a modification request initiated by a first service provider for modifying one or more service plan features associated with a service plan of the first service provider; and
    responsive to the modification request initiated by the first service provider:
        identifying, based at least in part on the modification request, at least one of service provider information or service plan information to be updated in one or more databases, wherein the service provider information includes mappings of a plurality of service providers to respectively offered service plan features associated with a service plan, and wherein the service plan information includes mappings of one or more service plans to wireless service accounts associated with users of mobile devices, wherein service plans mapped to at least a portion of the respective wireless accounts include a current service plan for the respective wireless account and at least one other service plan; and updating the one or more databases, wherein the updated one or more databases include one or more updated service plan features based at least in part on the modification request;

obtaining, via an established protocol, a request from a first mobile device, wherein the request is associated with service plan features available to the first mobile device;

processing the request from the first mobile device to identify updated service plan features available to the first mobile device, wherein processing the request includes mapping a mobile device identifier to information corresponding to updated service plan features; and causing transmission of information associated with the identified updated service plan features to the first mobile device.

12. The computer-implemented method as recited in claim 11, wherein the request from the first mobile device corresponds to a request to update the wireless service account associated with the first mobile device.

13. The computer-implemented method as recited in claim 12, wherein the update request comprises a request to delete a service plan feature associated with the wireless service account associated with the first mobile device.

14. The computer-implemented method as recited in claim 11, wherein the request from the first mobile device corresponds to an inquiry corresponding the wireless service account associated with the first mobile device.

15. The computer-implemented method as recited in claim 11, wherein the modification request initiated by the first service provider corresponds to a request for one or more of: adding a feature to a service plan, deleting a feature from a service plan, or modifying a feature of a service plan.

16. The computer-implemented method as recited in claim 11 further comprising:

obtaining, via an established protocol, a modification request initiated by a second service provider for modifying one or more service plan features associated with the second service provider; and responsive to the modification request initiated by the second service provider:

identifying, based at least in part on the modification request initiated by the second service provider, at least one of service provider information or service plan information to be updated in the one or more databases; and dynamically updating the at least one of service provider information or service plan information based on the modification request initiated by the second service provider.

17. The computer-implemented method as recited in claim 11 further comprising:

obtaining, via an established protocol, a second request from a second mobile device, wherein the second request is associated with service plan features available to the second mobile device;

processing the second request from the second mobile device to identify updated service plan features available to the second mobile device, wherein processing the request includes mapping a mobile device identifier corresponding to the second mobile device to information corresponding to updated service plan features; and causing transmission of information associated with the identified updated service plan features to the second mobile device.

18. The computer-implemented method as recited in claim 17, wherein the updated service plan features available to the second mobile device are different from the updated service plan features available to the first mobile device.

19. The computer-implemented method as recited in claim 17, wherein the request from the second mobile device corresponds to a request to update the wireless service account associated with the second mobile device.

20. The computer-implemented method as recited in claim 17, wherein the request from the second mobile device corresponds to an inquiry corresponding the wireless service account associated with the second mobile device.

* * * * *